(12) United States Patent
Cho et al.

(10) Patent No.: US 9,232,440 B2
(45) Date of Patent: Jan. 5, 2016

(54) METHOD AND APPARATUS FOR CONTROLLING SYSTEM OVERLOAD IN A WIRELESS COMMUNICATION SYSTEM

(71) Applicant: Samsung Electronics Co., Ltd., Suwon-si, Gyeonggi-do (KR)

(72) Inventors: Song Yean Cho, Seoul (KR); Han Na Lim, Seoul (KR); Sang Soo Jeong, Suwon-si (KR); Beom Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/347,870

(22) PCT Filed: Sep. 28, 2012

(86) PCT No.: PCT/KR2012/007899
§ 371 (c)(1),
(2) Date: Mar. 27, 2014

(87) PCT Pub. No.: WO2013/048175
PCT Pub. Date: Apr. 4, 2013

(65) Prior Publication Data
US 2014/0235262 A1    Aug. 21, 2014

(30) Foreign Application Priority Data

Sep. 30, 2011  (KR) .................. 10-2011-0099568

(51) Int. Cl.
*H04W 28/02* (2009.01)
*H04W 28/08* (2009.01)
*H04W 8/02* (2009.01)
*H04W 8/06* (2009.01)

(52) U.S. Cl.
CPC ............. *H04W 28/08* (2013.01); *H04W 8/02* (2013.01); *H04W 8/06* (2013.01); *H04W 28/0247* (2013.01); *H04W 28/0284* (2013.01)

(58) Field of Classification Search
CPC ................... H04W 28/0247; H04W 28/0284; H04W 28/08; H04W 8/02; H04W 8/06
USPC ..................................................... 455/453
See application file for complete search history.

(56) References Cited

U.S. PATENT DOCUMENTS

2002/0035642 A1* 3/2002 Clarke et al. .................. 709/244

FOREIGN PATENT DOCUMENTS

JP    2005-252510 A    9/2005

OTHER PUBLICATIONS

3GPP; Technical Specification Group Services and System Aspects; Study on Core Network Overload Solutions (release 11), 3GPP TR 28.843 V0.4.0 (Apr. 2011).*
HTC, Back-off UEs induced MME and HSS overload, 3GPP TSG SA WG2 Meeting #82, S2-105485, Jacksonville, Florida, USA, Nov. 15-19, 2010.

* cited by examiner

*Primary Examiner* — Nathan Taylor
(74) *Attorney, Agent, or Firm* — Jefferson IP Law, LLP

(57) ABSTRACT

The present invention relates to a method for controlling system overload in a wireless communication system. The method comprises: a first step in which a mobility management entity (MME) that has received a tracking region update request message from a first terminal transmits a location update request message to a home subscriber server (HSS); a second step in which, if the HSS has determined that a system overload has occurred, the HSS sets MME-backoff time for preventing the transmission of a request message to the HSS, and transmits a location update rejection message including said MME-backoff time to the MME; and a third step in which the MME drives a backoff timer corresponding to said MME-backoff time and rejects a TAU update request message from a terminal received prior to the completion of the driving of the backoff timer.

14 Claims, 11 Drawing Sheets

METHOD AND APPARATUS FOR CONTROLLING SYSTEM OVERLOAD IN A WIRELESS COMMUNICATION SYSTEM

TECHNICAL FIELD

The present invention relates to a system overload control method and apparatus for use in a wireless communication system. In more particular, the present invention relates to a system overload control method and apparatus for rejecting the request message of the terminal during a predetermined time period for controlling the overload of the Home Subscriber Server (HSS) when overload occurs.

BACKGROUND ART

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

In order to meet such requirements, Long Term Evolution (LTE) and LTE-Advanced (LTE-A) are under the standardization by the $3^{rd}$ Generation Partnership Project (3GPP) as one of the next generation mobile communication systems. LTE is a technology for realizing high-speed packet-based communications with the data rate of up to 100 Mbps. In order to accomplish this, a discussion is being held on several schemes: one scheme for reducing the number of nodes located in a communication path by simplifying a configuration of the network, and another scheme for maximally approximating wireless protocols to wireless channels.

Recently, with the introduction of LTE to the hot spot area, various wireless communication networks such as LTE, Global System for Mobile communications (GSM), and Universal Mobile Telecommunications System (UMTS) coexist in the same area. Accordingly, the terminal is configured to support multiple Radio Access Technologies (RATs) including GSM and UMTS as well as LTE radio. Also, the networks are operating in the multi-RAT environment such that the terminal operates in such a way of selecting one of multiple RATs.

However, if an error occurs at the control node managing some RATs or if the system reboot occurs with the necessity of system upgrade, the terminals operating with the corresponding RAT select different RATs simultaneously so as to cause overload to the system temporarily.

There is therefore a need of a method for controlling the system overload which may occur in the above situation.

DISCLOSURE OF INVENTION

Technical Problem

The present invention has been conceived to solve the above problem and aims to provide a system overload control method and apparatus that is capable of rejecting the request message of the terminal during a predetermined period when the overload occurs in order to control the overload of the Home Subscriber Server (HSS).

Solution to Problem

In accordance with an aspect of the present invention, a system overload control method of a wireless communication system includes a first step for transmitting a location update request message from a Mobility Management Entity (MME) received a Tracking Area Update (TAU) request message from a first terminal to a Home Subscriber Server (HSS), a second step for configuring, when the HSS determines that the system undergoes overload, an MME-backoff time for blocking transmission of request message to the HSS and transmitting a location update reject message including the MME-backoff time to the MME, and a third step for starting a backoff timer corresponding to the MME-backoff time and rejecting the TAU request message of the terminal which is received before expiry of the backoff timer.

In accordance with another aspect of the present invention, a Home Subscriber Server (HSS) controlling system overload of a wireless communication system includes an interface which performs communication with at least one node located in the wireless communication system and a controller which controls determining, when a location update request message is received from a Mobility Management Entity (MME) received a Tracking Area Update (TAU) request message from a terminal, configuring, when the HSS determines that the system undergoes overload, an MME-backoff time for blocking transmission of request message to the HSS and transmitting a location update reject message including the MME-backoff time to the MME.

Advantageous Effects of Invention

The system overload control method and apparatus of the present invention is capable of controlling the system overload caused by the error at the control node managing some RATs or rebooting for system upgrade efficiently by rejecting the request message of the terminal during a predetermined period.

MODE FOR THE INVENTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
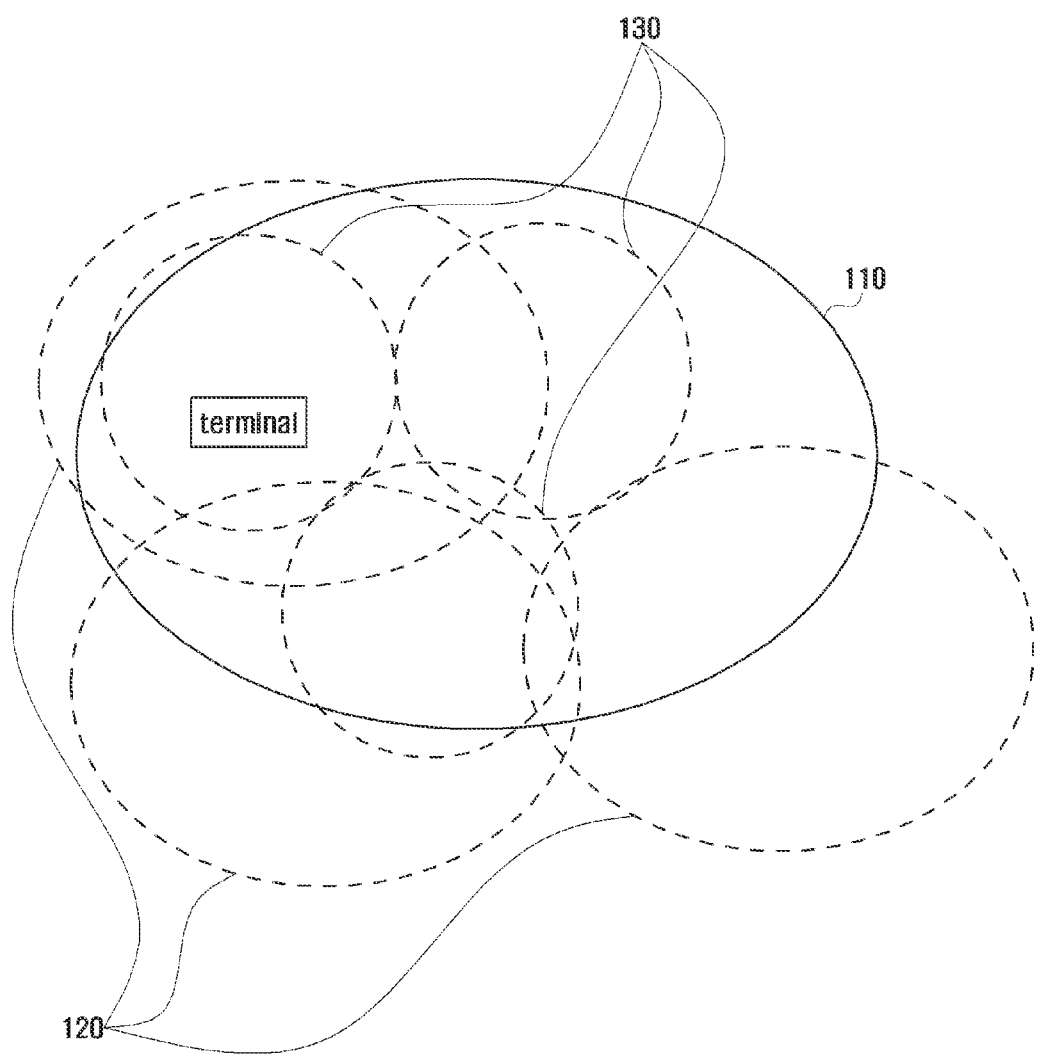
FIG. 1 is a diagram illustrating a structure of overlapping networks of multiple Radio Access Technologies (RATs).

FIG. 1 is a diagram illustrating a structure of overlapping networks of multiple Radio Access Technologies (RATs).

As shown in FIG. 1, the wireless communication system may include LTE, GSM, UMTS, etc. The terminal is provided with multi-RAT function supporting GSM and UMTS as well as LTE radio. Also, the network is provided with a plurality of RATs such that the terminal uses one of the RATs selectively.

In FIG. 1, the terminal which is capable of using GSM, UMTS, and LTE radios 110, 120, and 130 selectively may use the LTE RAT 130 for high speed data transmission. In the case that it is necessary to place a voice call but IP multimedia Subsystem (IMS) is not supported in LTE RAT, the terminal selects GSM 110 or UMTS 120 for use of a circuit network.

If an error occurs at the control node controlling an RAT or if rebooting is required for system upgrade in the above situation, the terminals using the corresponding RAT selects another RAT and perform location update and registration to the system managing the RAT simultaneously.

For example, if a Radio Network Controller (RNC) managing the UMTS 120 is rebooted such that it becomes impossible to use the service temporarily, the terminals supporting both the UMTS 120 and LTE RAT 130 select the LTE RAT to perform registration procedure with the Mobility Management Entity (MME) as the control node managing the LTE RAT. However, since the registration procedure has to perform the operation of enquiring subscriber information from HSSS, both the MME and HSS undergo overload temporarily. As a consequence, the registration-failed terminals retry registration procedure and the MME and HSS in overloaded state reject the registration attempts again. This is likely to cause the situation in which it fails to process the requests from the terminals outside the problematic area as well as the terminals inside the problematic area. That is, the problem occurring at the control node managing a certain area causes overload at the HSS and thus the program propagates into the entire system.

The present invention has been conceive the above problem and proposes a method for rejecting, when overload occurs at the HSS, the request message of the terminal during a predetermined time period to control the overload.

In the following, the present invention is described in the first to third embodiments. In this case, the first embodiment is directed to a method for the HSS to configure the backoff time to reject the request to the HSS during a predetermined time period when the MME as a control node receives over a predetermined amount of requests during a predetermined time period.

The second embodiment is directed to a method for the HSS accommodate a part of the requests from the outside of the problematic area using a load factor indicating the minimum load amount capable of being accommodated from the MME in addition to the first embodiment.

The third embodiment is directed to a method for designating the terminal transmitting the request constantly as a blacklisted terminal and setting the blacklisted terminal-specific backoff time in addition to the second embodiment.

<First Embodiment>

In the following, a description is made of the method for blocking the requests to the HSS during a predetermined time period with the backoff time configured by the HSS when the requests occurring at the MME as a control node is equal to or greater than a predetermined amount during a predetermined time period.

Figure 2:
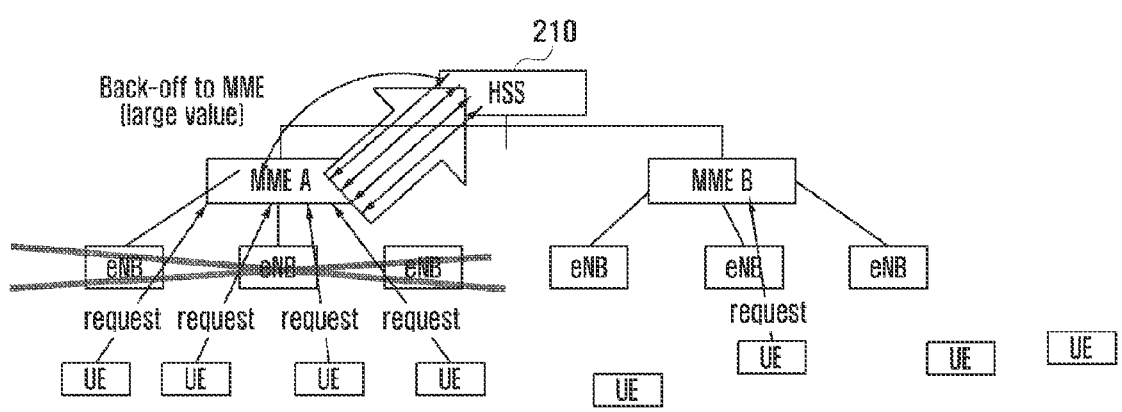
FIG. 2 is a diagram illustrating a procedure of blocking the request from the terminal by setting the backoff time when the MME managing the cell in a predetermined area undergoes the load equal to or greater than a predetermined amount according to the first embodiment.

FIG. 2 is a diagram illustrating a procedure of blocking the request from the terminal by setting the backoff time when the MME managing the cell in a predetermined area undergoes the load equal to or greater than a predetermined amount according to the first embodiment.

As described above, if the amount of requests from the MME during a predetermined time period is equal to or greater than a predetermined amount, the HSS 210 sets a backoff time in consideration of the number of requests and load degree for processing the corresponding requests and notifies the MME of the backoff time. Then the terminal suspends transmitting the request message until the corresponding backoff time expires.

Figure 3:
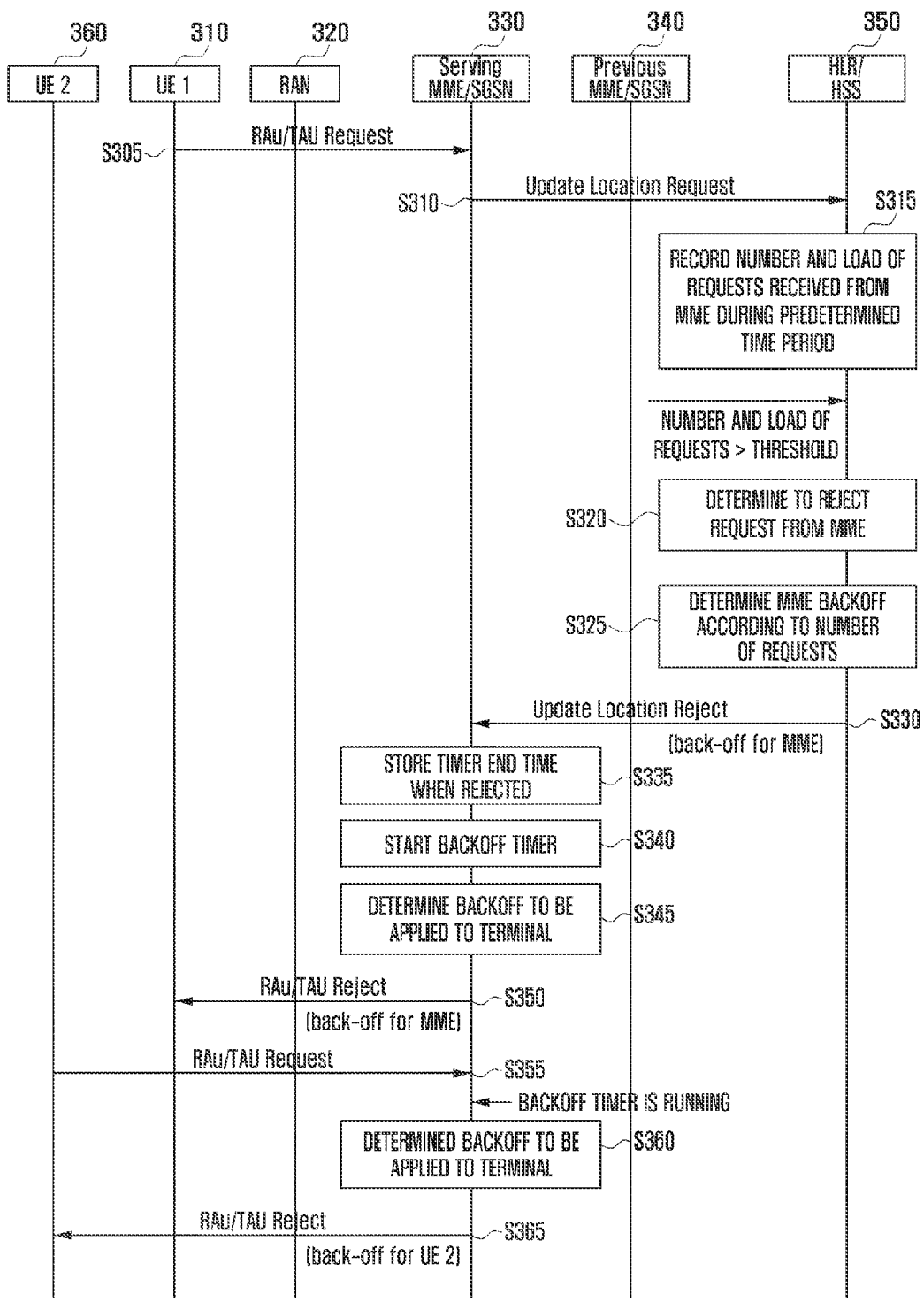
FIG. 3 is a signal flow diagram illustrating the system overload control method according to the first embodiment of the present invention.

FIG. 3 is a signal flow diagram illustrating the system overload control method according to the first embodiment of the present invention.

The first terminal 310 sends the MME or Serving GPRS Support Node (SGSN) a Routing Area Update (RAU) request message or Tracking Area Update (TAU) request message through the Radio Access Network (RAN) 320 at step S305. Although FIG. 3 shows only the example of transmitting the RAU or TAU request message, the present invention is not limited thereto. As well as RAU and TAU request messages, all the types of request messages carrying a certain request from the control node, which has received the corresponding request message, to the server having the subscriber information such as authentication request. In the following description, it is assumed that the terminal transmits the TAU request message for explanation convenience.

Although MME/SGSN are depicted as the control node in FIG. 3, the present invention is not limited thereto but may be embodied with any of all the types of nodes capable of managing terminal mobility. For explanation convenience, the description is made under the assumption that the control node is MME.

The MME acquires subscription information of the first terminal 310 and sends the HSS 350 a location update request message to register the MME controlling the first terminal 310 according to the current location of the first terminal 310 at step S310. Upon receipt of this message, the HSS 350 records the number of requests received from the MME 330 during a predetermined time period and the load degree required for processing the requests at step S315.

If the number of requests received from the MME 330 during the predetermined time period is equal to or greater than a predetermined threshold, the HSS 350 determines to reject the requests from the MME 330 at step S320. Next, the HSS 330 determines an MME backoff time to be applied to the MME 330 based on the number of requests and the load degree at step S325. The HSS 350 generates a location update reject message including the MME-backoff time and sends the MME 330 the location update reject message at step S330.

If the location update reject message is received, the MME 330 store the timer end time based on the MME-backoff time received from the HSS 350 at step S335 and triggers the backoff timer at step S340.

If the location update reject message is received from the HSS 350, this means that the MME 330 cannot transmit any request message to the HSS 350 during the backoff time. Accordingly, the MME 330 determines a terminal-backoff time to be applied to the terminal (particularly, the first terminal) based on the MME-backoff time received from the HSS 345. In this case, the terminal-backoff time may be greater than the MME-backoff time.

The MME 330 generates a TAU reject message including the terminal-backoff time and sends the first terminal 310 the TAU reject message at step S350. Then the first terminal 310 suspends transmitting the request message to the MME 330 before the expiry of the terminal-backoff time.

According to an embodiment of the present invention, the MME 330 records the number of requests from the terminal and load degree of the requests by Tracking Area or cell and sets the backoff time for the terminal in the area having large amount of terminal requests differentially.

In the state that the MME-backoff timer is running at the MME 330, the TAU request message transmitted by the second terminal 360 may arrive at the MME 330 at step S355. Then the MME 330 determines the backoff time to be applied to the second terminal 360 at step S360. In this case, the backoff time to be applied to the second terminal 360 may be greater than the residual time of the backoff timer started at step S340.

The MME 330 sends the second terminal 360 the TAU reject message including the backoff time to be applied to the second terminal 360 at step S365. Then the second terminal 360 suspends transmitting the request message before the expiry of the received backoff time.

According to the first embodiment described above, it is possible to propagate the influence of the surge of requests from the terminal.

<Second Embodiment>

In the following, a description is made of the method for the HSS to accommodate some of the requests transmitted from the outside of the problematic area based on the load factor indicating the acceptable load amount received from the MME according to the second embodiment of the present invention.

Figure 4:
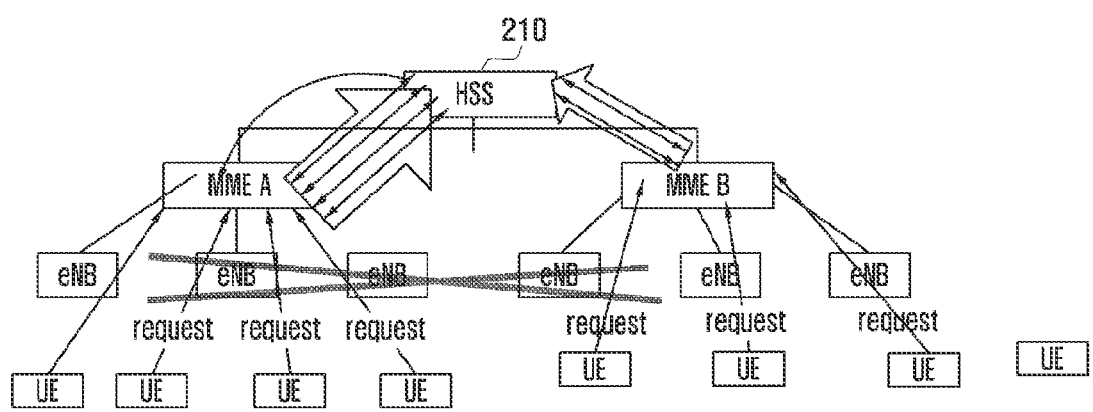
FIG. 4 is a diagram illustrating a situation of surge of requests from the terminal in the area under management of multiple MMEs.
Figure 5:
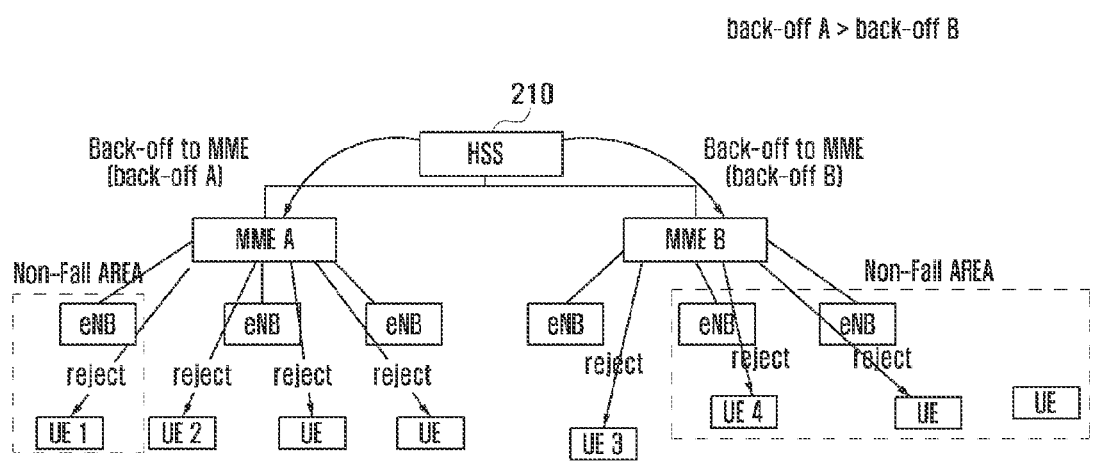
FIG. 5 is a diagram illustrating a problematic situation when only the backoff time is applied for mitigating the surge of the requests from the terminal in the area under management of multiple MMEs.

In order to explain the necessity of the second embodiment, FIGS. 4 and 5 are provided.

FIG. 4 is a diagram illustrating a situation of surge of requests from the terminal in the area under management of multiple MMEs. FIG. 5 is a diagram illustrating a problematic situation when only the backoff time is applied for mitigating the surge of the requests from the terminal in the area under management of multiple MMEs.

The first embodiment is directed to the situation where a control node, i.e. an MME, cannot use the eNB or other RAT in the area under management of the control node such that the requests surges to the MME and thus the HSS undergoes the surge too.

However, it cannot be sure that the problematic area is the area controlled by one MME. That is, as shown in FIG. 4, if the problem has occurred in the area under management of two or more MME (MME A and MME B) and then recovered, requests may surge. In this case, the requests are transmitted to the HSS via two MMEs (MME A and MME B), and the HSS applies the backoff time to both the MMEs such that the request of the terminal located in the non-problematic area may be rejected as shown in FIG. 5.

In the case of FIG. 4, as shown in FIG. 5 according to the first embodiment, the HSS generates the backoff time based on the degree of the request surge and sends the MME a request reject message including the backoff time. Then the MME rejects the request of the terminal during the backoff time. In this case, as shown in FIG. 5, even the requests from the terminals located in the non-problematic area are rejected, resulting in irrational situation.

In order to solve this problem, the HSS according to the second embodiment of the present invention sends the MME a load factor indicating the minimum acceptation load amount to be applied for the backoff time. At this time, the HSS determines the backoff time in proportion to the number of requests transmitted by the MME and the load degree for processing the requests. Meanwhile, the HSS determines the load factor in inversely proportion to the number of requests transmitted by the MME and the load degree for processing the requests.

Figure 6:
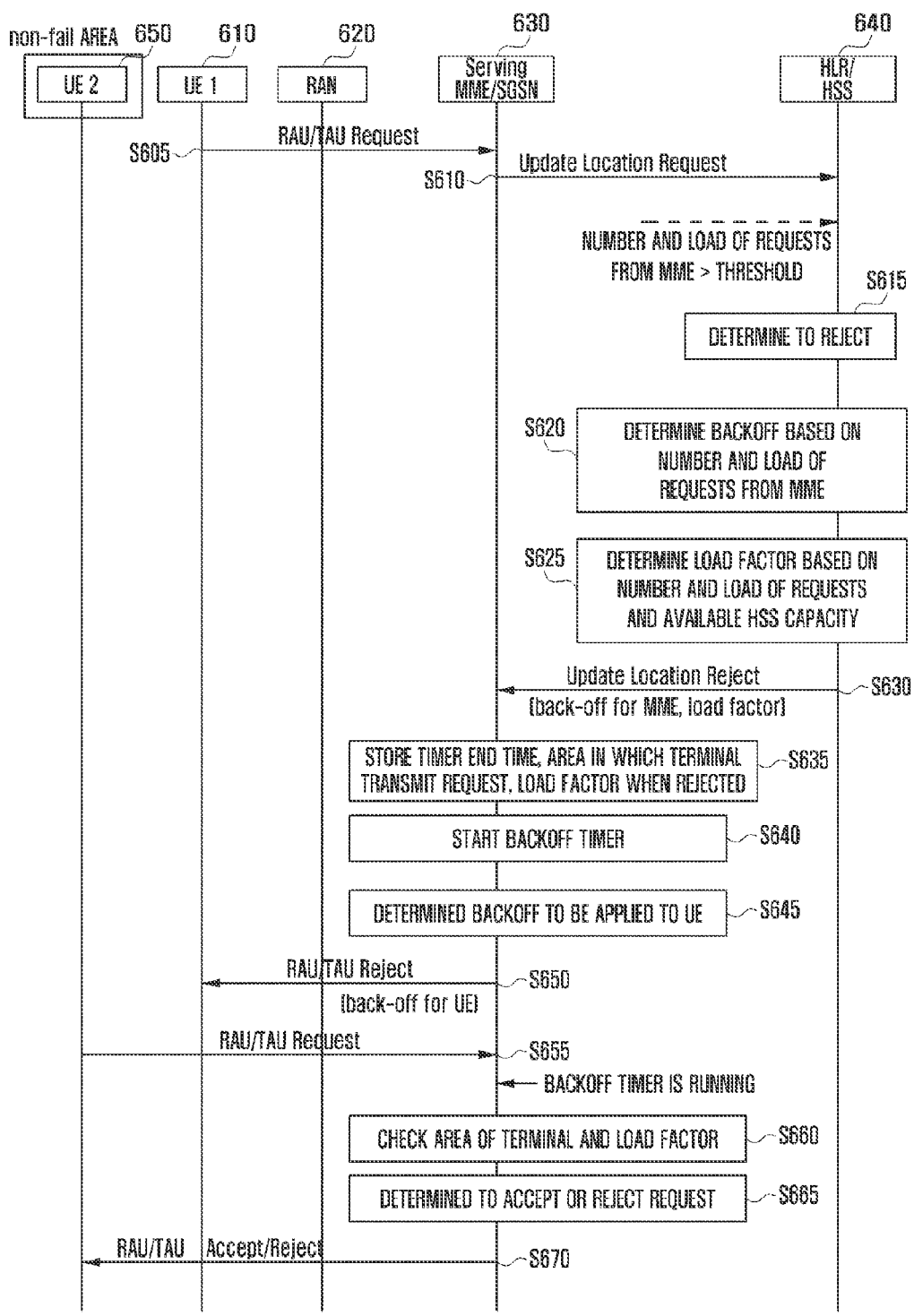
FIG. 6 is a signal flow diagram illustrating the system overload control method according to the second embodiment of the present invention.

FIG. 6 is a signal flow diagram illustrating the system overload control method according to the second embodiment of the present invention.

The first terminal 610 sends the MME 630 a TAU request message via the RAN 620 at step S605. Then the MME 630 acquires the subscription information of the first terminal 610 and sends the HSS 640 a location update request message to register the MME controlling the first terminal 610 according to the current location of the first terminal 610 at step S610. Upon receipt of this message, the HSS 640 records the number of requests received from the MME 630 during a predetermined time period and the load degree for processing the requests.

If the number of requests and the load degree are equal to or greater than predetermined thresholds, the HSS 640 determines to reject the request at step S615. At step S620, the HSS 640 determines the MME-backoff time to be applied to the MME 630 based on the number of requests and the load degree.

At the same time, the HSS 640 configures the information on the minimum load capable of transferring from the MME 630 to the HSS 640 as the load factor so as to block the requests from the MME 630 completely at step S625. In this case, the HSS 640 sets the load factor based on the number of requests received from the MME 630, load degree for processing the requests, and available HSS capacity of the HSS 640.

The HSS 640 sends the MME 630 an update location reject message including the MME-backoff time and load factor at step S630.

Then the MME stores the backoff timer end time, the area in which the terminal has transmitted the request (Tracking Area ID or Cell ID), and load factor at step S635. The MME 630 starts the backoff timer at step S640.

The MME determines the terminal-backoff time to be applied to the terminal (particularly, the first terminal) based on the MME-backoff timer received from the HSS 640 and the requests from the terminal locating in the area at step 5645. In this case, the terminal-backoff time may be greater than the MME-backoff time.

The MME 630 generates a TAU reject message including the terminal-backoff time and sends the first terminal 610 the TAU reject message at step 5650. Then the first terminal 610 suspends transmitting the request message to the MME 630 before the expiry of the terminal-backoff time.

Meanwhile, the second terminal 650 located in the non-problematic area (non-fail area) may send the MME 630 a TAU request message via the RAN 620 at step S655. Then the MME 630 determines whether it is possible to transmit the request to the HSS 640.

In more detail, the MME 630 checks the area where the second terminal 650 which has transmitted the TAU request message is located and the load factor in the corresponding area at step 5660. The MME 630 determines whether to accommodate the second terminal 650 according to the size of the load factor and, if it is determined to accept the transmitted by the second terminal 650, sends the second terminal 650 a TAU accept message at step 5670. Otherwise if it is determined to reject the request transmitted by the second terminal 650, the MME 630 sends the second terminal 650 a TAU reject message at step 5670.

Figure 7:
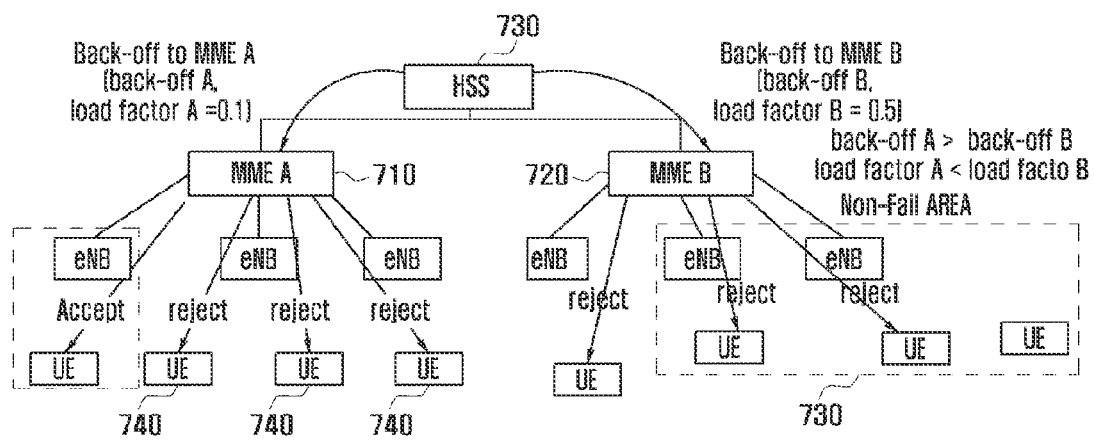
FIG. 7 is a diagram illustrating the result of applying the second embodiment of the present invention.

FIG. 7 is a diagram illustrating the result of applying the second embodiment of the present invention.

FIG. 7 is depicted under the assumption that any problem has occurred in the area under management of the MME A 710 and the MME B 720 and then recovered. In this case, the HSS 730 applies the backoff time A to the MME A 710 and the backoff time B to the MME B 720. In this case, the backoff time B is greater than the backoff time A and, this is because the problem has occurred at time region in the area under management of the MME B 720.

Then the load factor A configured to the MME A 710 has a value less than the load factor B configured to the MME B 720 and, this means that the capacity for processing the requests transmitted from the MME A 710 is smaller than the capacity (or load) capable of processing the requests transmitted from the MME B 720.

Accordingly, the requests of the terminal 730 located in the non-fail area having the larger load factor has the higher probability of being acceptable as compared to the terminals 740 located in the fail area.

<Third Embodiment>

In the following, a description is made of the procedure of designating the terminal transmitting a request constantly as a blacklisted terminal and configuring the backoff time to be applied to the blacklisted terminal separately according to the third embodiment of the present invention.

Figure 8:
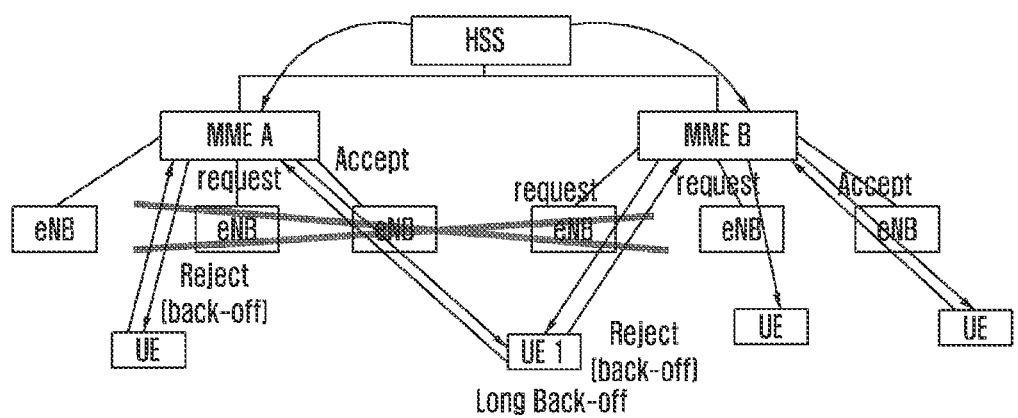
FIG. 8 is a diagram illustrating a situation where the terminal located in an area under overlapped managements of the two MMEs transmits the request message switching the MMEs alternately.

In order to explain the necessity of the third embodiment, FIG. 8 is provided.

FIG. 8 is a diagram illustrating a situation where the terminal located in an area under overlapped managements of the two MMEs transmits the request message switching the MMEs alternately.

According to the second embodiment, when the terminals located at the boundary (edge) of the areas managed by the two MMEs attempts transmitting the request changing areas, it is possible to control this. Particularly, the current wireless communication systems are designed in consideration of only the load at the MME but not the load at the HSS. Accordingly, if the MME controlling the terminal is changed due to the change of the tracking are of the terminal, the backoff time which has been applied to the terminal previously becomes useless.

Although it is difficult for the MME to detect the above problem, the HSS is capable of detecting the problem. The HSS records the time when the terminal has transmitted the request message and, if the a number of request message transmission made at an interval shorter than a predetermined threshold value is equal to or greater than a predetermined value, designates the corresponding terminal as the blacklisted terminal At the same time, the HSS configures a blacklisted terminal-backoff time to the blacklisted terminal by itself Hereinafter, a description is made of the detail of the third embodiment with reference to FIG. 9.

Figure 9A:
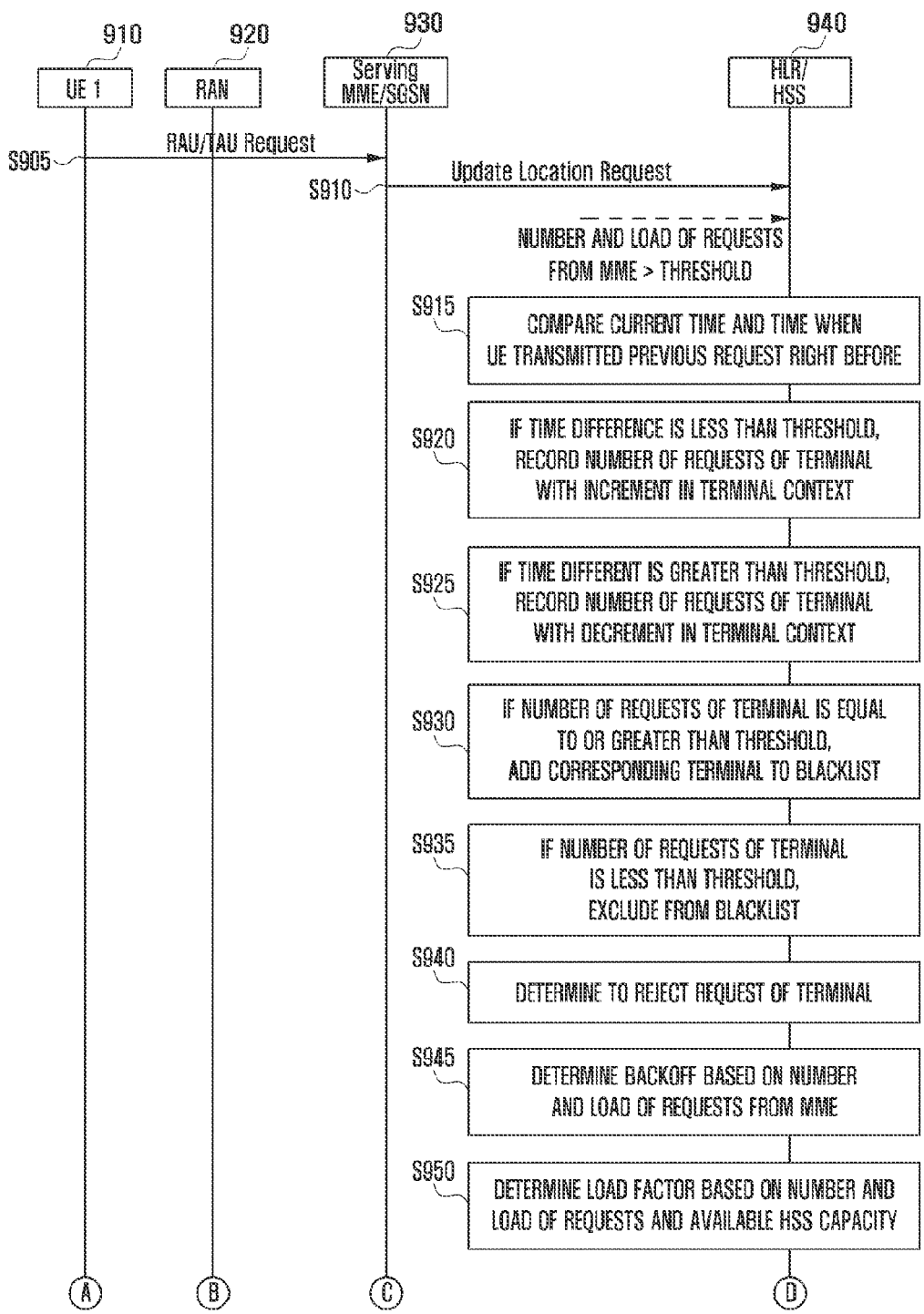
FIG. 9 is a signal flow diagram illustrating the system overload control method according to the third embodiment of the present invention.
Figure 9B:
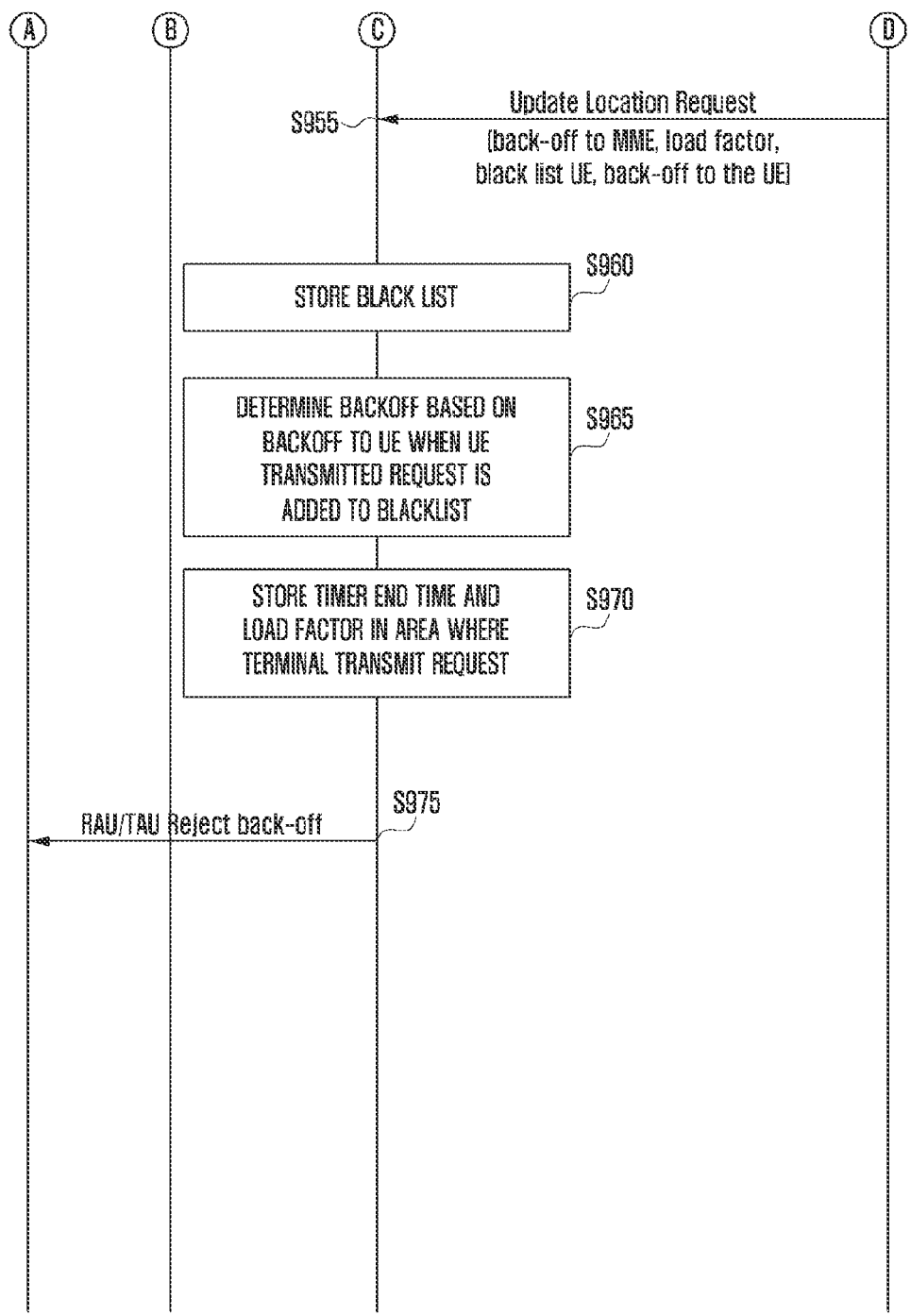

FIG. 9 is a signal flow diagram illustrating the system overload control method according to the third embodiment of the present invention.

The terminal 910 sends the MME 930 a TAU message via the RAN 920 at step S905. Then the MME 930 acquires the subscription information of the terminal 910 and sends the HSS 940 a location update request message to register the MME controlling the terminal 910 depending on the current location of the terminal 910 at step S910.

Then the HSS 940 compares the time when the current terminal request message is received and the time when the previous terminal request message has been received at step S915. If the difference between the two times is less than a predetermined threshold, the HSS 940 increases a counter and, otherwise if the difference is greater than the threshold, decreases the counter. If the counter becomes equal to or greater than a predetermined value, the HSS 940 adds the corresponding terminal to a blacklist.

The above procedure is described in more detail with reference to FIG. 9.

If the difference between the time when the current terminal request message is received and the time when the previous terminal request message has been received is less than the threshold value, the HSS 940 increases the number of terminal requests in the terminal context at step S920. That is, the HSS 940 determines that the corresponding terminal transmits the request message at a too short interval and thus increases the number of requests as the condition for adding the terminal to the black list. Otherwise if the time difference is greater than the threshold value, the HSS 940 decreases the number of the terminal requests in the terminal context at step S925.

If the number of requests of the terminal 910 is equal to or greater than the threshold value, the HSS 940 adds the terminal 910 to the blacklist at step S930. In this case, the HSS 940 may record the time when the terminal 910 is added to the black list. According to an embodiment of the present invention, the HSS 940 checks the times when the terminal have been added to the blacklist and may deletes the terminals added before a predetermined time duration from the blacklist.

Otherwise if the number of requests of the terminal 910 added to the blacklist is less than the threshold value, the HSS 940 excludes the terminal in the blacklist at step S935.

Since the number of requests received from the MME 930 during the predetermined time period is equal to or greater than a predetermined threshold value, the HSS 940 determines to reject the request of the terminal at step S940.

The HSS 940 also determines the MME-backoff time to be applied to the MME 930 based on the number of requests and load degree at step S945. If the terminal 910 is added to the blacklist, the HSS 940 may configure the blacklisted terminal-backoff time to be applied to the terminal 910 separately.

The HSS 940 configures the information on the minimum load capable of allowing the MME 930 to transmit as the load factor so as to prevent the request from the MME 930 from being blocked completely at step S950. In this case, the HSS 940 configures the load factor based on the number of requests from the MME 930, load degree for processing the requests, and available capacity of HSS 940 (available HSS capacity).

The HSS 940 generates a location update reject message including the MME-backoff time, load factor, blacklist, blacklisted terminal-backoff time. The HSS 940 sends the MME 930 the generated location update reject message.

According to an embodiment of the present invention, the black list may be transmitted to the MME 930 in the location update accept message for accepting the request of a specific terminal with the load factor as well as the location update reject message.

If the location update reject message is received form the HSS 940, the MME 930 checks the blacklist included in the message and stores the blacklist at step S960. If the terminal 910 is included in the blacklist, the MME 930 assigns a terminal-backoff time based on the blacklisted terminal-backoff time at step S965.

The MME 930 starts the backoff timer at the same time as storing the backoff timer end time, Tracking Area in which the terminal has transmitted the request (TA ID or Cell ID), and load factor at step S970. The MME 930 generates a TAU reject message including the terminal-backoff time and sends the terminal 910 the TAU reject message at step S975.

Afterward, the MME 930 rejects the request message transmitted by the terminal based on the stored blacklist. The blacklist may be overwritten by the new blacklist received from the HSS 940 and, if update fails, may be deleted after a predetermined time elapses.

Figure 10:
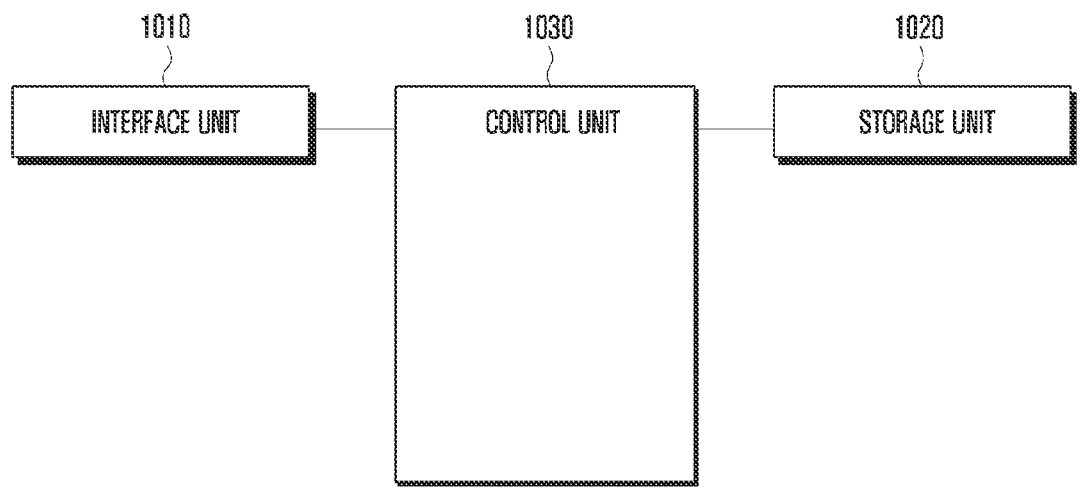
FIG. 10 is a block diagram illustrating an internal configuration of the HSS according to an embodiment of the present invention.

FIG. 10 is a block diagram illustrating an internal configuration of the HSS according to an embodiment of the present invention. As shown in FIG. 10, the HSS of the present invention may include an interface unit 1010, a storage unit 1020, and a control unit 1030.

The interface unit 1010 is responsible for communication with at least one node located in the wireless communication system. For example, the interface unit 1010 establishes a wired or wireless connection with the MME to communication signal.

The storage unit 1020 stores the program for controlling overall operations of the HSS. The storage unit 1020 according to an embodiment of the present invention may store the information on the number of requests received from the MME and the load degree for processing the requests. The storage unit 1020 also may store the blacklist including the information on the terminals transmitting the request messages repeatedly at certain intervals and update the black list.

The control unit 1030 controls the overall operations of the HSS. In more detail, the control unit 1030 detects the receipt of the location update request message from the MME which receives the tracking area update request message from the terminal. The control unit 1030 determines whether the system undergoes overload and, if so, configures the MME-backoff time to prevent the MME from transmitting the request message to the HSS. The control unit 1030 generates the location update reject message including the MME-backoff time and sends the MME the location update reject message.

The control unit 1030 also may configure the MME-backoff time according to the number of requests transmitted by the MME and the load degree for processing requests. The control unit 1030 configures the load factor indicating the minimum acceptable load from the MME in the state that the backoff timer is running and generates the location update reject message including the load factor and sends the MME the location update reject message.

The control unit 1030 also may configure the load factor based on the number of requests received from the MME, load degree for processing the requests, and the available HSS capacity.

The control unit 1030 also may calculate the transmission interval for the terminal to transmit the tracking area update request message repeatedly and, if the transmission interval is repeated a number of times less than a predetermined threshold value, add the terminal to the black list. The control unit 1030 may control such that the location update reject message including the black list is transmitted to the MME. In this case, the control unit 1030 may configure the terminal-backoff time to be applied to the terminal by itself Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for controlling overload by a mobility management entity (MME) in a wireless communication system, the method comprising:
    transmitting a location update request message to a home subscriber server (HSS) if a first terminal transmits a tracking area update (TAU) request message to the MME;
    receiving a location update reject message including an MME-backoff time and a load factor from the HSS if the system undergoes overload, wherein the MME-backtime is for blocking transmission of a request message to the HSS and the load factor is for indicating a minimum acceptable load from the MME; and
    starting a backoff timer corresponding to the MME-backoff time and rejecting the TAU request message of the terminal which is received before expiry of the backoff timer,
    wherein the MME-backoff time is configured based on a number of requests transmitted by the MME and a load degree for processing the requests by the HSS.

2. The method of claim 1, further comprising:
    determining a terminal-backoff timer to be applied to the first terminal based on the MME-backoff time; and
    transmitting a TAU reject message generated with the terminal-backoff time to the first terminal.

3. The method of claim 2, further comprising:
    receiving the TAU request message from a second terminal;
    configuring, if the backoff timer is running, a second terminal-backoff time; and
    transmitting the TAU reject message generated with the second terminal-backoff time to the second terminal.

4. The method of claim 1, wherein the load factor is configured based on the number of requests, load degree for processing the requests, and available HSS capacity.

5. The method of claim 4, further comprising:
    checking, if the TAU request message is received from a certain terminal, an area of the terminal and the load factor corresponding to the area; and
    accepting or rejecting the TAU request of the terminal according to the load factor corresponding to the area.

6. The method of claim 5, further comprising:
    receiving the location update reject message including a blacklist from the HSS,
    wherein the blacklist is configured that a transmission interval of TAU request message transmission of the first terminal is calculated and the first terminal is added to the black list, if the transmission interval repeats a number of times less than a certain threshold value, by the HSS.

7. A mobility management entity (MME) for controlling overload in a wireless communication system, the MME comprising:
    a transceiver configured to:
        transmit a location update request message to a home subscriber server (HSS) if a first terminal transmits a tracking area update (TAU) request message to the MME, and
        receive a location update reject message including an MME-backoff time and a load factor from the HSS if the system undergoes overload, wherein the MME-backtime is for blocking transmission of a request message to the HSS and the load factor is for indicating a minimum acceptable load from the MME; and a controller configured to:
start a backoff timer corresponding to the MME-backoff time, and
reject the TAU request message of the terminal which is received before expiry of the backoff timer,
wherein the MME-backoff time is configured based on a number of requests transmitted by the MME and a load degree for processing the requests by the HSS.

8. The MME of claim 7, wherein the controller determines a terminal-backoff timer to be applied to the first terminal based on the MME-backoff time and controls the transceiver to transmit a TAU reject message generated with the terminal-backoff time to the first terminal.

9. The MME of claim 8,
wherein the transceiver receives the TAU request message from a second terminal, and
wherein the controller configures, if the backoff timer is running, a second terminal-backoff time, and controls the transceiver to transmit the TAU reject message generated with the second terminal-backoff time to the second terminal.

10. The MME of claim 7, wherein the load factor is configured based on the number of requests, load degree for processing the requests, and available HSS capacity.

11. The MME of claim 10, wherein the controller checks, if the TAU request message is received from a certain terminal, an area of the terminal and the load factor corresponding to the area and accepts or rejects the TAU request of the terminal according to the load factor corresponding to the area.

12. The MME of claim 11,
wherein the transceiver receives the location update reject message including a blacklist from the HSS, and
wherein the blacklist is configured that a transmission interval of TAU request message transmission of the first terminal is calculated and the first terminal is added to the black list, if the transmission interval repeats a number of times less than a certain threshold value, by the HSS.

13. A method for controlling overload by a home subscriber server (HSS) in a wireless communication system, the method comprising:

receiving a location update request message from a mobility management entity (MME) if a first terminal transmits a tracking area update (TAU) request message to the MME;

configuring, if the system undergoes overload, an MME-backoff time for blocking transmission of request message to the HSS;

configuring, a load factor indicating minimum acceptable load from the MME; and transmitting a location update reject message including the MME-backoff time and the load factor to the MME, wherein the MME-backoff time is for blocking transmission of request message to the HSS and the load factor is for indicating minimum acceptable load from the MME, and wherein the MME-backoff time is configured based on a number of requests transmitted by the MME and a load degree for processing the requests.

14. A home subscriber server (HSS) for controlling overload in a wireless communication system, the HSS comprising:

a transceiver configured to receive a location update request message from a mobility management entity (MME) if a first terminal transmits a tracking area update (TAU) request message to the MME;

a controller configured to:
configure, if the system undergoes overload, an MME-backoff time for blocking transmission of request message to the HSS,
configure a load factor indicating a minimum acceptable load from the MME, and
control the transceiver to transmit a location update reject message including the MME-backoff time and the load factor to the MME, wherein the MME-backtime is for blocking transmission of a request message to the HSS and the load factor is for indicating a minimum acceptable load from the MME, and wherein the MME-backoff time is configured based on a number of requests transmitted by the MME and a load degree for processing the requests.

* * * * *